(12) United States Patent
Chapman

(10) Patent No.: US 9,540,025 B1
(45) Date of Patent: Jan. 10, 2017

(54) CHILD RESTRAINT SYSTEM

(71) Applicant: Barry Glenn Chapman, Port Charlotte, FL (US)

(72) Inventor: Barry Glenn Chapman, Port Charlotte, FL (US)

( * ) Notice: Subject to any disclaimer, the term of this patent is extended or adjusted under 35 U.S.C. 154(b) by 0 days.

(21) Appl. No.: 14/874,445

(22) Filed: Oct. 4, 2015

Related U.S. Application Data

(60) Provisional application No. 62/061,172, filed on Oct. 8, 2014.

(51) Int. Cl.
  *B62B 3/14* (2006.01)
(52) U.S. Cl.
  CPC ................... *B62B 3/1452* (2013.01)
(58) Field of Classification Search
  CPC ..................................................... B62B 3/1452
  See application file for complete search history.

(56) References Cited

U.S. PATENT DOCUMENTS

| | | | |
|---|---|---|---|
| 944,020 A | 12/1909 | DeCamp | |
| 1,991,633 A | 2/1935 | Serpico | |
| 2,383,918 A | 8/1945 | Muller | |
| 3,306,661 A * | 2/1967 | Allen | B62B 3/144 280/33.993 |
| 3,350,136 A * | 10/1967 | Allen | B62B 3/144 280/33.993 |
| 4,108,489 A | 8/1978 | Salzman | |
| 4,204,695 A | 5/1980 | Salzman | |
| 4,324,430 A | 4/1982 | Dimas et al. | |
| 4,550,800 A | 11/1985 | Dietrich | |
| 4,561,676 A * | 12/1985 | Trubiano | B60R 22/105 24/265 EC |
| 4,621,589 A * | 11/1986 | Thinnes | A01K 27/004 119/770 |
| 4,637,622 A | 1/1987 | Burgard | |
| 4,699,090 A | 10/1987 | Voorhees | |
| 4,854,607 A | 8/1989 | Mandracchia et al. | |
| 4,867,464 A * | 9/1989 | Cook | A47D 15/006 182/3 |
| 5,263,726 A * | 11/1993 | Wood | B62B 3/1452 280/33.992 |
| 5,325,818 A * | 7/1994 | Leach | A01K 27/002 119/770 |
| 5,378,046 A * | 1/1995 | Gordy | A62B 35/0006 182/3 |
| 5,439,253 A * | 8/1995 | Trubiano | A47D 15/006 280/33.993 |
| 5,547,250 A * | 8/1996 | Childers | B62B 3/144 297/219.12 |
| 5,641,200 A * | 6/1997 | Howell | B62B 3/144 280/33.993 |

(Continued)

*Primary Examiner* — Erez Gurari
(74) *Attorney, Agent, or Firm* — Livingston Loeffler, P.A.; Edward M. Livingston, Esq.; Bryan L. Loeffler, Esq.

(57) ABSTRACT

A child restraint system (1) having a mounting clip (2) positioned over an upper crossbar (12) and vertical bars (19) of a shopping cart seat (14) back support (13). The mounting clip is centered on the back support so that it rests directly behind a child when seated in the shopping cart. A belt (16) extends from sides of the mounting clip and wraps around the child's torso encircling the child preferably above the abdomen. This keeps the child in an upright position and prevents the child from leaning to the front or to the side, thereby reducing any risk of injury.

21 Claims, 3 Drawing Sheets

(56) References Cited

U.S. PATENT DOCUMENTS

| | | | |
|---|---|---|---|
| 5,669,118 A | 9/1997 | Frano et al. | |
| 5,791,026 A | 8/1998 | Anscher | |
| 6,044,528 A | 4/2000 | Schottin | |
| 6,101,687 A | 8/2000 | Giampavalo et al. | |
| 6,101,690 A | 8/2000 | Giampavalo et al. | |
| 6,186,521 B1* | 2/2001 | Divoky | A47D 15/006 280/33.992 |
| 6,206,471 B1* | 3/2001 | McGowan | B62B 3/144 297/219.12 |
| 6,224,152 B1* | 5/2001 | Hughes | A47D 15/006 297/219.12 |
| 6,409,272 B1* | 6/2002 | Martin | B60N 2/2812 297/256.17 |
| 6,575,342 B1* | 6/2003 | Sundara | A47D 13/025 224/158 |
| 6,575,480 B2 | 6/2003 | McKelvey | |
| 6,604,265 B2 | 8/2003 | Giampavalo | |
| 6,618,915 B2 | 9/2003 | Giampavalo | |
| 6,832,767 B1* | 12/2004 | Sandvik | B62B 3/144 280/33.993 |
| 7,513,020 B2 | 4/2009 | Giampavalo | |
| 7,559,126 B2 | 7/2009 | Giampavalo | |
| 7,591,510 B1* | 9/2009 | Giampavolo | B62B 3/1452 182/3 |
| 7,644,937 B2 | 1/2010 | Giampavalo | |
| 7,681,288 B1 | 3/2010 | Giampavalo | |
| 7,685,685 B2 | 3/2010 | Giampavalo | |
| 7,722,058 B2 | 5/2010 | Giampavalo | |
| 7,725,993 B1 | 6/2010 | Giampavalo | |
| 8,424,138 B1* | 4/2013 | Pinnell | B62B 3/1444 5/118 |
| 8,702,177 B1* | 4/2014 | Hogue | A61F 5/3769 297/484 |
| 9,061,607 B2* | 6/2015 | Greenwood | B60R 22/30 |
| 9,192,242 B1* | 11/2015 | Anderson | B60R 22/105 |
| 9,283,976 B2* | 3/2016 | Wieth | B62B 3/1452 |
| 2004/0061297 A1* | 4/2004 | Booker | B62B 3/144 280/33.993 |
| 2012/0272926 A1* | 11/2012 | Zack | B62B 3/1452 119/857 |

* cited by examiner

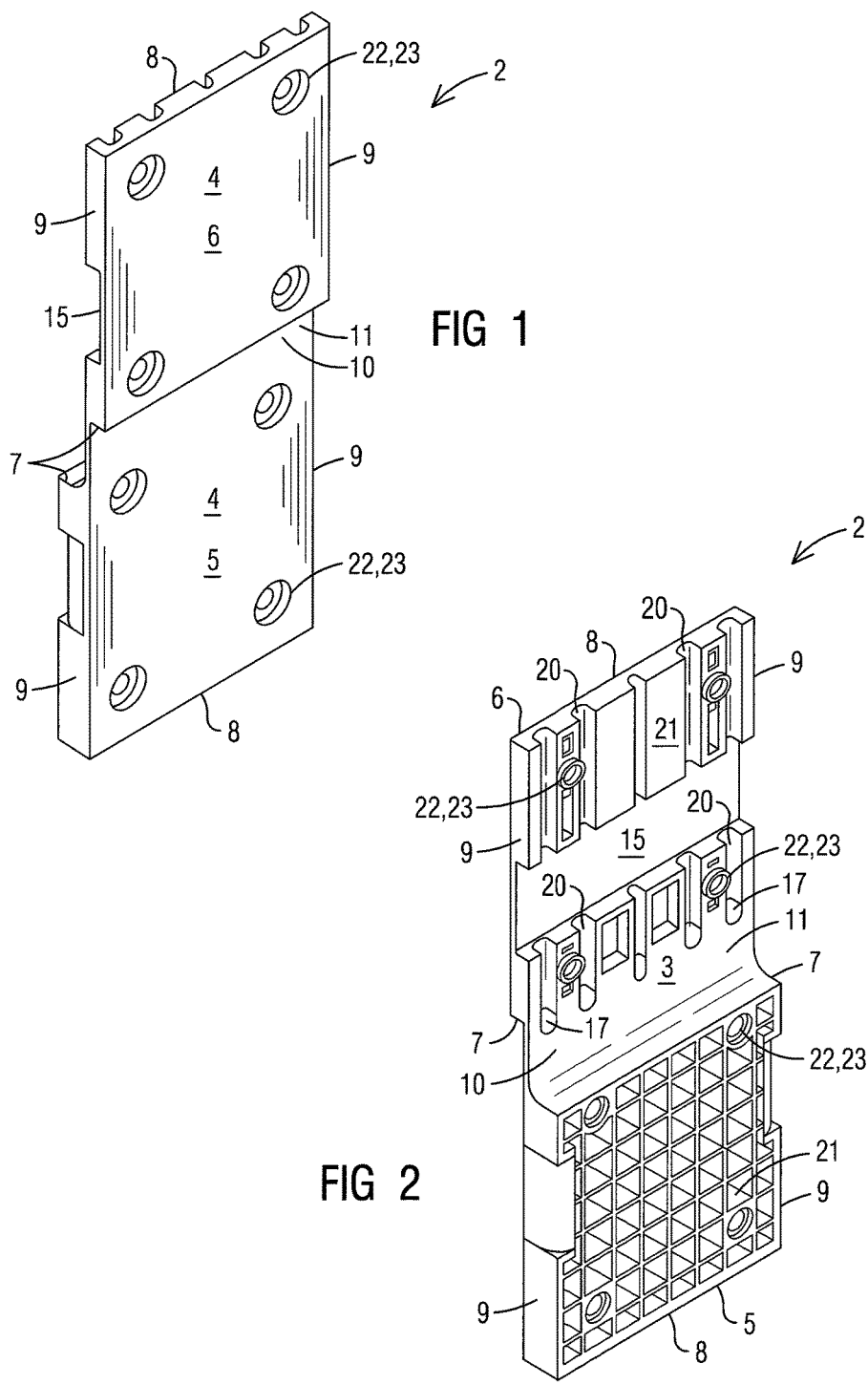

CHILD RESTRAINT SYSTEM

CROSS-REFERENCE TO RELATED APPLICATIONS

This application claims priority to provisional application No. 62/061,172, filed on Oct. 8, 2014. The patent application identified above is incorporated herein by reference in its entirety to provide continuity of disclosure.

FIELD OF THE INVENTION

This invention relates to child restraint systems, and more particularly to child restraint systems used on shopping carts.

BACKGROUND OF THE INVENTION

Child restraint systems, especially those used on shopping carts, have been around for many years. Conventional child restraint systems are typically seat belts attached directly to a seat of a shopping cart to prevent children from falling out of the shopping cart.

Although child restraint systems have been in use for a number of years, child injury rates in shopping carts are still very high. Approximately 66 children are injured every day in shopping cart related accidents in the USA alone. According to the Consumer Product Safety Commission (CPSC), 90 percent of these injuries are to the head of which most are from the child falling out of the cart. This is mainly due to the fact that conventional child restraint systems designs do not adequately secure the child within the shopping cart seat. Current designs allow the child to bend forward over the handle of the shopping cart, angle their torso to either side of the shopping cart, and shift their body off center allowing them to reach for objects that can be pulled down onto them from nearby shelves.

Therefore, a need exists for a child restraint system that properly aligns a child's torso to a desired vertical center of a shopping cart seat and limits the child's movement to the desired seating location and position.

SUMMARY OF THE INVENTION

The primary object of the present invention is to provide a child restraint system that properly aligns a child's torso to a desired vertical center of a shopping cart seat and limits the child's movement to the desired seating location and position and restricts the child's torso movement to a desired seating location, both horizontally and vertically, thereby preventing unwanted movement of the child.

The present invention fulfills the above and other objects by providing a child restraint system having a mounting clip that is secured to a belt on a seat back support of a shopping cart seat. The position of the mounting clip allows the belt to be "wrapped" around the child's torso, preferably above the abdomen, thereby preventing both horizontal and vertical movement of the child when secured on the seat.

The mounting clip is positioned over an upper crossbar and vertical bars of a shopping cart seat back support. The mounting clip is centered on the back support so that it rests directly behind a child when seated in the shopping cart. A belt that extends from the sides of the mounting clip wraps around the child's upper torso encircling the child. This keeps the child in an upright position and prevents the child from leaning to the front or to the side.

The present invention may also include features, such as an RFID chip to allow monitoring and tracking of the device. This invention also allows space for warning signage on the front and back of the device that is durable enough to last the life of the child restraint system. The placement of signage will be in the user's line of vision and easily readable. An optional QR code on the device will give end users the ability to scan and view instructions and educational materials online.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 1 is a perspective outer view of a mounting clip of the present invention in an open position;

FIG. 2 is a perspective inner view of a mounting clip of the present invention in an open position;

DESCRIPTION OF THE PREFERRED EMBODIMENTS

Figure 3:
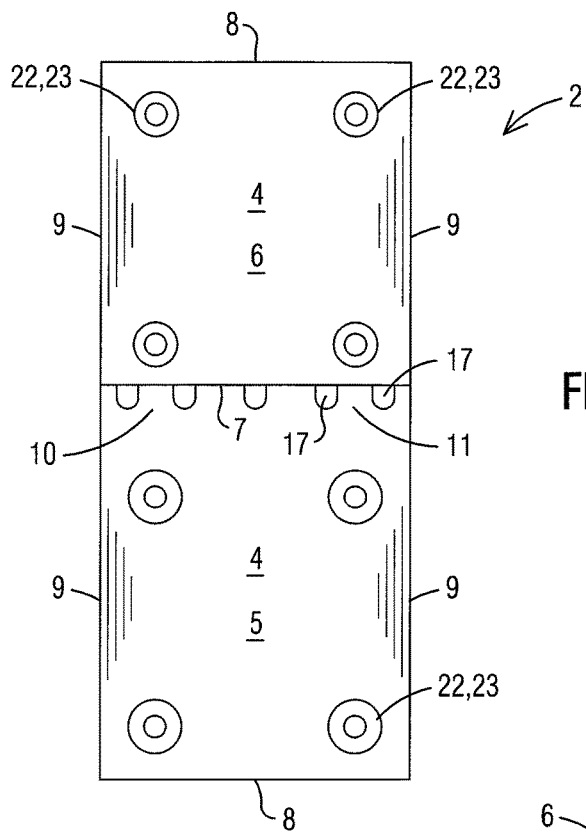
FIG. 3 is a front view of an outer surface of a mounting clip of the present invention in an open position.
Figure 4:
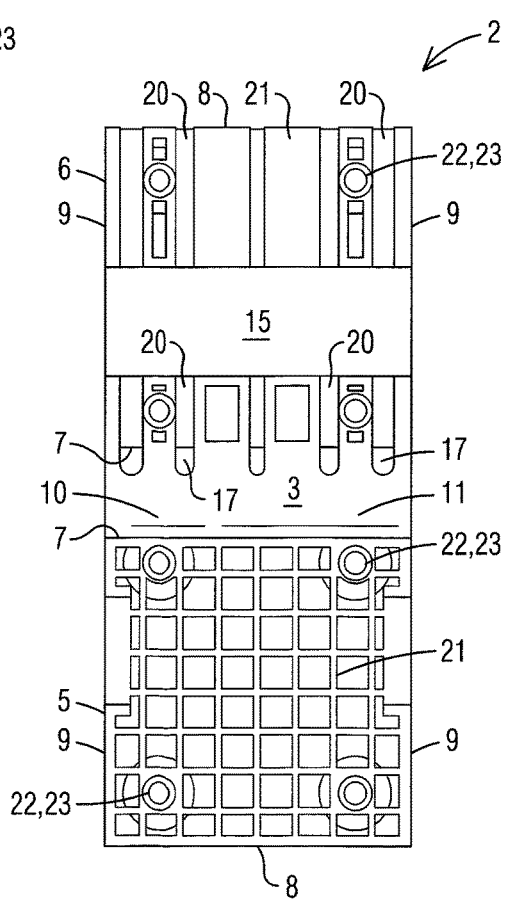
FIG. 4 is a rear view of an inner surface mounting clip of the present invention in an open position.
Figure 5:
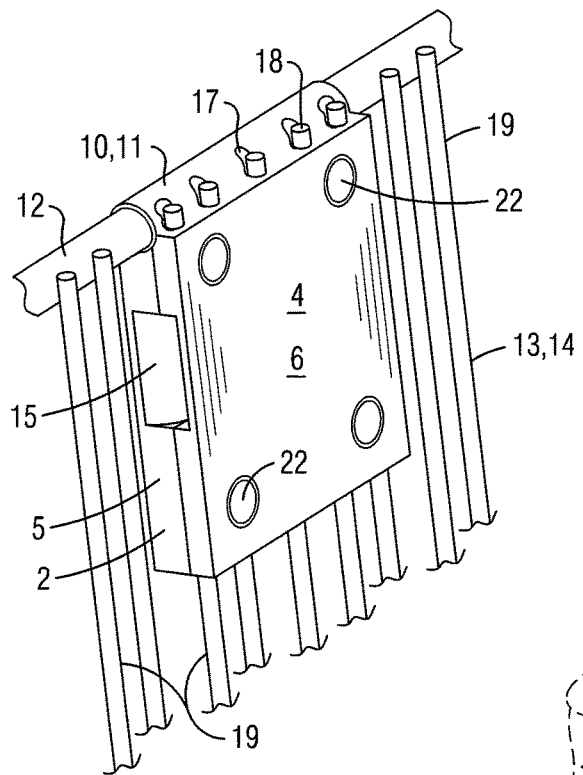
FIG. 5 is a perspective view of a child restraint system of the present invention installed on a shopping cart.

For purposes of describing the preferred embodiment, the terminology used in reference to the numbered components in the drawings is as follows:

1. child restraint system, generally
2. mounting clip
3. inner surface of mounting clip
4. outer surface of mounting clip
5. rear panel
6. front panel
7. top edge of panel
8. bottom edge of panel
9. side edge of panel
10. hinge means
11. planar connecting strip
12. crossbar
13. back support
14. shopping cart seat
15. belt channel
16. belt
17. aperture
18. end of vertical bar
19. vertical bar
20. vertical bar channel
21. spacer
22. attachment means
23. receptor hole
24. buckle
25. male end of buckle 26. female end of buckle
27. right side of belt
28. left side of belt With reference to FIGS. 1-6 listed above, the child restraint system 1 of the present invention comprises a mounting clip 2 having an inner surface 3 and an outer surface 4. The mounting clip 2 further comprises a rear panel 5 and a front panel 6. As illustrated here, the rear panel 5 and front panel 6 are rectangular-shaped and each have a top edge 7, bottom edge 8 and side edges 9. However, the rear panel 5 and front panel 6 may be any geometric shape and/or shaped like animals, characters and so forth. The top edges 7 of the rear panel 5 and front panel 6 are connected via a hinge means 10, which as illustrated here is a foldable planar connecting strip 11 that is semi-flexible to allow the planar connecting strip 11 to be folded over a crossbar 12 of a back support 13 of a shopping cart seat 14, as illustrated in FIG. 5. The planar connecting strip 11 conforms to the cross bar 12 by wrapping around the cross bar 12, thereby allowing the inner surfaces 3 of the rear panel 5 and front panel 6 to press completely flat against each other when folded together.

A horizontal belt channel 15 is located on the mounting clip 2 between the front panel 5 and the rear panel 6, preferably on the inner surface 3 of the front panel 6. Alternatively, the horizontal belt channel may be located on the inner surface 3 of the rear panel 5. The horizontal belt channel 15 is recessed within the inner surface 3 of the front panel 6 and provides a space for a belt 16 to be placed through the mounting clip 2, while still allowing the rear panel 5 and front panel 6 to press completely flat against each other when folded together. The belt 16 is preferably clamped in place by the front panel 5 and the rear panel 6.

A plurality of apertures 17 are preferably located along the top edge 7 of the front panel 6 and/or on the planar connecting strip 11. The plurality of apertures 17 fit over ends 18 of vertical bars 19 of the back support 13 of the shopping cart seat 14 when the front panel 6 and rear panel 5 are folded over the crossbar 12 of the back support 13 of the shopping cart seat 14.

A plurality of vertical bar channels 20 are located on the inner surface 3 of the front panel 6 and/or the inner surface 3 of the rear panel 5. The vertical bar channels 20 provide recessed groves for the vertical bars 19 of the back support 13 of the shopping cart seat 14 to rest in when the front panel 6 and rear panel 5 are folded over the crossbar 12 of the back support 13 of the shopping cart seat 14. The vertical bar channels 20 allow the rear panel 5 and front panel 6 to press completely flat against each other when folded together, thereby locking the mounting clip 2 in place on the back support 13 of the shopping cart seat 14.

The front panel 6 and/or rear panel 5 preferably have a predetermined thickness that allows for the placement of the horizontal belt channel 15 and vertical bar channels 20 within the inner surfaces 3 of the front panel 6 and/or rear panel 5. The predetermined thickness, which may be accomplished using one or more spacers 21 that define the horizontal belt channel 15 and vertical bar channels 20, in combination with the horizontal belt channel 15 and vertical bar channels 20 allow the rear panel 5 and front panel 6 to press completely flat against each other when folded together over the back support 13 of a shopping cart 14.

One or more attachment means 22, such as clips, bolts, screws, rivets and so forth may be used to secure the rear panel 5 to the front panel 6 when folded together over the back support 13 of a shopping cart seat 14. Attachment means receptor holes 23 are located on the rear panel 5 and front panel 6 to allow the mounting clip 2 to be secured in a closed position on a shopping cart seat 14 using one or more attachment means 22.

Figure 6:
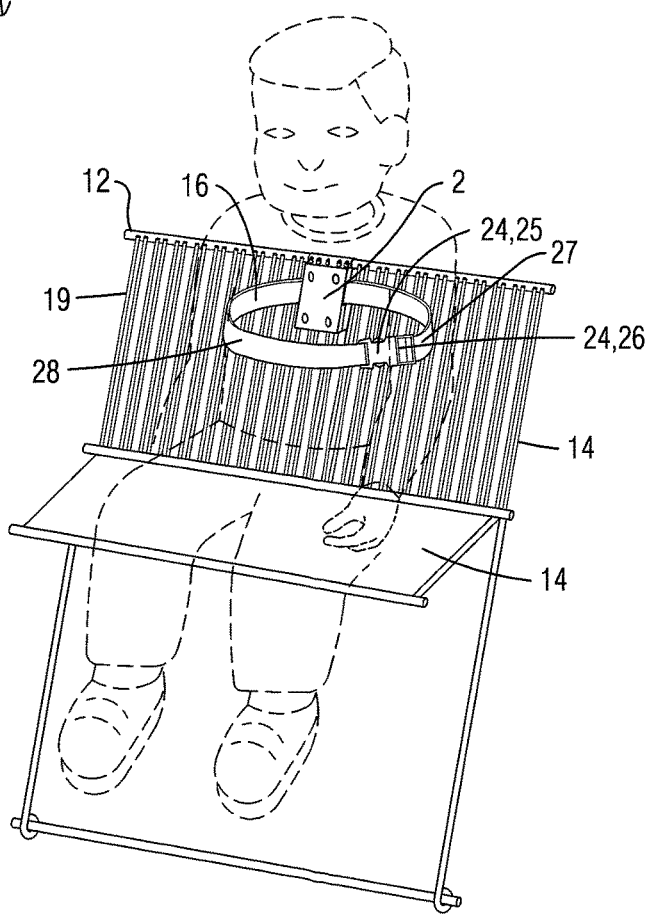
FIG. 6 is a perspective view of a child restraint system of the present invention installed on a shopping cart in use with a ghost child.

A belt 16 is placed through the horizontal belt channel 15 prior to securing the mounting clip 2 to the shopping cart seat 14. The belt 16 has a buckle 24, preferably having a male end 25 and a female end 26, located thereon for securing the belt 16 around a child, thereby safely restraining the child within the shopping car seat 14 in a central position, as illustrated in FIG. 6. The mounting clip 2 allows the belt 16 to be positioned and clamped or locked in place within the mounting clip 2. This allows the buckle 24 of the belt 16 to be positioned on the child's side, thereby preventing the child from being able to reach the buckle 24 with both hands. For example, a right side 27 of the belt 16 having the female end 26 may be less than the left side 28 of the belt 16 having the male end 25 or vice versa. The female end 26 would fixedly attached to the belt 16, thereby making it only long enough to reach the side of the child and not long enough to wrap around to the front of the child. The belt 16 is preferably clamped in place by the front panel 5 and the rear panel 6 to keep the female end 26 a fixed distance from the mounting clip 2. The male end 25 would be adjustably attached to the opposing end of the belt 16 so that it could be adjusted to the size of the child and to reach the fixed female end 26.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A child restraint system for shopping carts comprising:
   a mounting clip having an inner surface and an outer surface; said mounting clip having a rear panel and a front panel; said rear panel and front panel each having a top edge;
   said top edges of the rear panel and the front panel being connected via a hinge means that allows the rear panel and front panel to be folded over a crossbar of a back support of a shopping cart seat; a belt located within the mounting clip; said belt having two ends; and
   said belt having a buckle located thereon for securing the two ends of the belt together.

2. The child restraint system of claim 1 further comprising:
   a horizontal belt channel located on the mounting clip between the rear panel and the front panel when the rear panel and front panel are in a folded position for holding the belt within the mounting clip.

3. The child restraint system of claim 2 wherein:
   said horizontal belt channel is located on the inner surface of the front panel.

4. The child restraint system of claim 2 wherein:
   said horizontal belt channel is located on the inner surface of the rear panel.

5. The child restraint system of claim 1 wherein:
   said hinge means is a foldable planar connecting strip.

6. The child restraint system of claim 5 wherein:
   said planar connecting strip is a semi-flexible material.

7. The child restraint system of claim 1 further comprising:
   a plurality of apertures located along the top edge of the front panel.

8. The child restraint system of claim 1 further comprising:
a plurality of vertical bar channels located on the inner surface of the front panel.

9. The child restraint system of claim 1 further comprising:
a plurality of vertical bar channels located on the inner surface of the rear panel.

10. The child restraint system of claim 1 further comprising: at least one spacer located on the rear panel.

11. The child restraint system of claim 1 further comprising: at least one spacer located on the front panel.

12. A child restraint system for shopping carts comprising:
a mounting clip having an inner surface and an outer surface; said mounting clip having a rear panel and a front panel; said rear panel and front panel each having a top edge;
said top edges of the rear panel and the front panel being connected via a hinge means that allows the rear panel and front panel to be folded over a crossbar of a back support of a shopping cart seat; a belt located within the mounting clip; said belt having two ends;
said belt having a buckle located thereon for securing the two ends of the belt together; and
a horizontal belt channel located on the mounting clip between the rear panel and the front panel when the rear panel and front panel are in a folded position for holding the belt within the mounting clip.

13. The child restraint system of claim 12 wherein:
said horizontal belt channel is located on the inner surface of the front panel.

14. The child restraint system of claim 12 wherein:
said horizontal belt channel is located on the inner surface of the rear panel.

15. The child restraint system of claim 12 wherein:
said hinge means is a foldable planar connecting strip.

16. The child restraint system of claim 15 wherein:
said planar connecting strip is a semi-flexible material.

17. The child restraint system of claim 12 further comprising:
a plurality of apertures located along the top edge of the front panel.

18. The child restraint system of claim 12 further comprising:
a plurality of vertical bar channels located on the inner surface of the front panel.

19. The child restraint system of claim 12 further comprising:
a plurality of vertical bar channels located on the inner surface of the rear panel.

20. The child restraint system of claim 12 further comprising:
at least one spacer located on the rear panel.

21. The child restraint system of claim 12 further comprising: at least one spacer located on the front panel.

\* \* \* \* \*